Nov. 17, 1925.　　　　　　　　　　　　　　　　1,562,113
A. A MEYER
SLIDING GATE
Filed Nov. 22, 1924
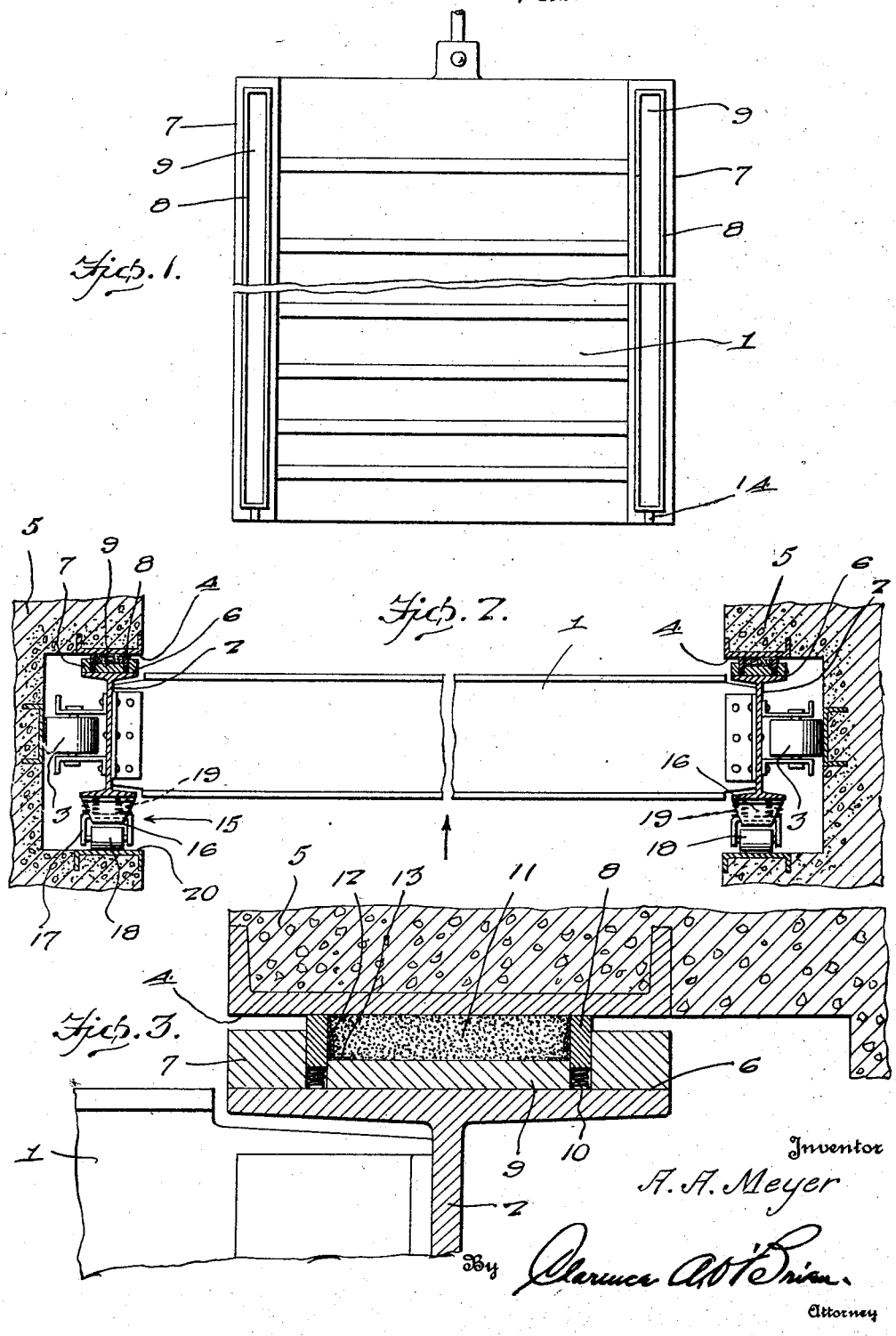
Inventor
A. A. Meyer
By Clarence A. O'Brien
Attorney Patented Nov. 17, 1925.

1,562,113

UNITED STATES PATENT OFFICE.

ADOLPH A. MEYER, OF WASHINGTON, DISTRICT OF COLUMBIA.

SLIDING GATE.

Application filed November 22, 1924. Serial No. 751,547.

*To all whom it may concern:*

Be it known that I, ADOLPH A. MEYER, a citizen of Switzerland, residing at Washington, in the District of Columbia, have invented certain new and useful Improvements in Sliding Gates, of which the following is a specification.

This invention relates to sliding gates, and particularly to sliding gates used in water control structures, such as dams and the like.

In sliding gate structures of the character above mentioned, wherein the gates are retained in position by headwater pressure, great difficulties have been experienced in raising and lowering these gates under the pressure of this head water, due to the friction between the contact faces of the gate and the guide of the gate.

An object of this invention is to provide means whereby the friction between the gate and the guide structure is materially reduced, in order that the gate may be raised and lowered in a substantially easy manner, and without the use of a large amount of power as usually required in the operation of these gates.

Another object of the invention is to reduce this sliding friction by interposing a suitable lubricant, in a manner that the same will be permanently contained and engage the bearing surface of the stationary guide for the gate and form the sliding surface for the gate contacting with said stationary guide surface.

The invention further includes the provision of novel means for effecting the above and other objects in the use of a lubricant or substance having a low sliding friction, as pointed out more specifically in the following description and claims directed to the preferred form of the invention, it being understood, however, that various other means may be provided for effecting the same result, without departing from the spirit and scope of the invention as described and claimed.

In the drawing, forming a part of this application:

Figure 1 is an elevational view of the gate looking from the down stream side, having the bearing surfaces thereof constructed for receiving the bearing and friction reducing substance.

Figure 2 is a horizontal sectional view, through the gate and the adjacent structure having the adjacent guide surfaces.

Figure 3 is an enlarged detail horizontal sectional view, illustrating more particularly the details and manner of applying the lubricating substance to the gate, and the manner in which the same cooperates with the stationary guide surface.

1 indicates a sliding gate of any desirable form, and structure well known in the art, and which is provided at the ends with vertically arranged I-beams 2, which form the end members of the gate. A suitable structure is indicated at 3, in Figure 2, which is ordinarily used to retain the gate in the proper position with relation to the stationary guide surfaces 4, of the stationary wall structure 5. The arrow in Figure 2 indicates the direction of application of pressure of headwater on the gate, for forcing the ends 6 of the I-beams 2, toward the stationary guide surfaces 4.

In order to reduce the enormous friction which would occur between the metallic contacts of the space 6 of the I-beams with the stationary guide surfaces 4, the present invention provides for the introduction of a suitable friction reducing substance between these surfaces. For this purpose, a plate member 7 is mounted on the end 6 of each of the I-beams 2, as illustrated in Figures 2 and 3, which plate is formed with a central rectangular or tapered opening for slidably receiving a rectangular frame 8. A cooperating plate member 9 of rectangular form is positioned within the rectangular opening of the plate 7 and is substantially smaller in section, as illustrated in Figure 3 of the drawings, and cooperates with the plate member 7 in providing a guideway for the rectangular frame 8. A plurality of suitable springs are positioned in the guideway in any desired manner, said springs being illustrated at 10, in Figure 3, between the portion 6 of the I-beam, and the frame 8 for projecting said frame outwardly into contact with the stationary guide surface 4. This frame 8 forms a retaining means for any suitable form of friction reducing substance, as indicated at 11 which is interposed between the stationary guide surface 4, and the cooperating plate 9. This friction reducing substance may be termed a lubricant or other character of substance for producing low friction, and is in the form of some convenient substance, having the properties of a lubricant. This substance in being interposed between the portion 6 of the I-beam and the stationary guide surface carries substantially the entire headwater pressure of the gate on the guide surfaces, while at the same time reducing the sliding friction to an extent that the power required for operating the gate can be considerably reduced. The springs 10 are illustrated as being coil springs, but may be of any other form of spring desired, for the purpose of projecting the frame 8 into engagement with the stationary guide surface, in order to retain the friction reducing substance 11 within the frame.

In order to prevent any leakage or flow of a portion of the friction reducing substance 11 into the guideway for the frame 8 between the plates 7 and 9, cooperating packing members are indicated at 12 and 13 respectively, the packing member 12 being secured to the frame 8, while the packing member 13 is secured to the plate 9, in a manner that the adjacent free edges overlap, as illustrated in Figure 3, to prevent any leakage of the substance 11, past the frame 8. While a pair of overlapping cooperating packing members 12 and 13 are illustrated, it may or may not be necessary to use the same according to the character of friction reducing substance used and the headwater pressure on the gate, under the usual head of water maintained. Any other suitable form of packing means for preventing the flow of the substance 11 into the guideways for the frame 8 may be provided, which is found desirable within the scope of this invention.

Where necessary to prevent all leakage of water past the gate, it may be found desirable to provide protection, as indicated at 14, on the bottom of the frame 8, as shown in Figure 1, for preventing slight leakage below the bottom of the main portion of the frame. Any other suitable means may be provided in lieu of this projection 14. There are various forms of friction reducing substances or lubricants of a substantially hard character, which are known to the art, which may be adapted for use in connection with this invention, and which are mounted as indicated at 11 in the frame 9, and which will withstand the tremendous headwater pressure applied to the gates and transmit the same to the stationary bearing surfaces 4, while at the same time substantially reducing the sliding friction of the gate, in order that the same may be raised or lowered under headwater pressure with a minimum amount of power.

Suitable means indicated generally at 15, including a bracket member 16 mounted on the I-beam 2 carrying a lower frame 17 and roller 18, projected outwardly by the coil springs 19, is provided, so that the rollers 18 will engage suitable guide members 20, for retaining the gate in position to slidably engage the stationary guide surfaces 4, when there is insufficient or a lack of headwater pressure on the gate. This construction may be dispensed with, in types of construction where headwater pressure is maintained on the gate at all times. While a frame 17 carrying the roller 18, projects outwardly by the springs 19, as illustrated in the drawings, in Figure 2, for retaining the gate in position so that the frame 8 and the lubricating substance 11 is at all times in contact with the stationary guide surface 4, it is to be understood that any other suitable form of structure for accomplishing this purpose may be used.

What is claimed is:

1. In combination, a stationary guide surface, a movable gate having a surface opposed to the guide surface, a substantially rectangular retaining frame mounted on the opposed surface of the gate and normally projected to engage the stationary guide surface, and a friction reducing packing resiliently mounted and retained in said frame for providing a low friction contact surface for the gate with said stationary guide surface and for preventing leakage therebetween.

2. In combination, a stationary guide surface, a moveable gate having a surface opposed to the guide surface, a substantially rectangular retaining frame mounted on the opposed surface of the gate, means for projecting the frame to engage the stationary guide surface, a friction reducing packing mounted and retained in said frame for providing a low friction contact surface for the gate with said stationary guide surface, and preventing leakage therebetween, and resilient means urging the gate toward the guide surface.

In testimony whereof I affix my signature.

ADOLPH A. MEYER.